May 6, 1941. W. S. HUXFORD 2,241,371
METHOD AND APPARATUS FOR DETERMINING THE WAVE FORM
OF A PERIODIC ELECTRICAL IMPULSE
Filed March 25, 1938 2 Sheets-Sheet 1
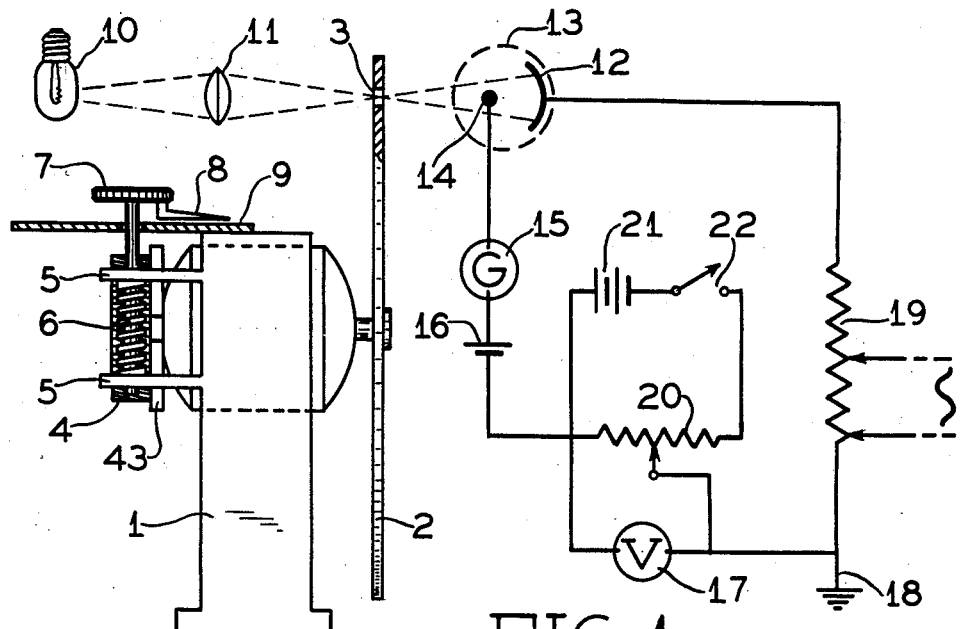
FIG_1_
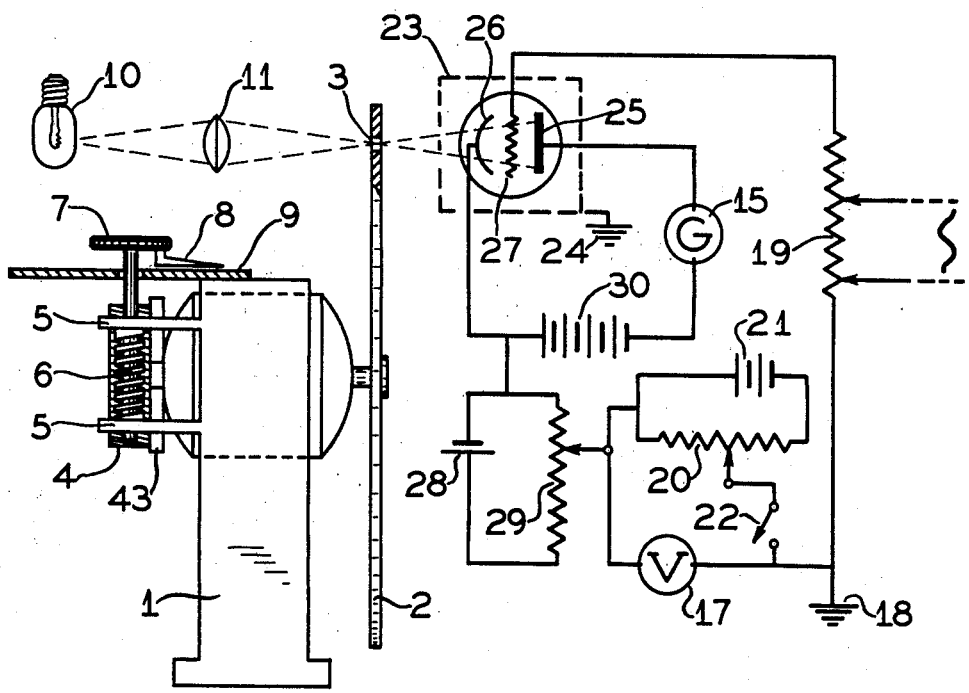
FIG_2_
Walter S. Huxford INVENTOR.
BY P. J. Whelan
ATTORNEY.

May 6, 1941. W. S. HUXFORD 2,241,371
METHOD AND APPARATUS FOR DETERMINING THE WAVE FORM
OF A PERIODIC ELECTRICAL IMPULSE
Filed March 25, 1938 2 Sheets-Sheet 2

INVENTOR.
Walter S. Huxford
BY
P. J. Whelan
ATTORNEY.

Patented May 6, 1941

2,241,371

UNITED STATES PATENT OFFICE 2,241,371

METHOD AND APPARATUS FOR DETERMINING THE WAVE FORM OF A PERIODIC ELECTRICAL IMPULSE

Walter S. Huxford, Evanston, Ill., assignor, by mesne assignments, to Standard Oil Development Company, Linden, N. J., a corporation of Delaware Application March 25, 1938, Serial No. 198,153

6 Claims. (Cl. 175—183)

The present invention is directed to a method and apparatus for determining the wave form of any periodic electrical pulse of current or potential.

The object of the present invention is the provision of a method and instrument for determining with precision the shape of any periodic electrical pulse of current or potential.

A further object of the present invention is the provision of an instrument of the character described which works upon a principle different from those upon which the usual forms of oscillographs are based and which is capable of measuring values of current and potential which are much too small to be measured by cathode ray or mechanical oscillographs except by the use of an auxiliary amplifying circuit which leads to distortion of the original wave form.

An additional object of the present invention is the provision of an instrument of the character described which includes not only means for determining the wave form of a periodic current or potential but also means for determining the value of the current or potential at any point on its wave form.

Briefly, the method of the present invention is based on the principle that the number of electrons released in a photo tube or other light sensitive device by the action of light depends on the value of the electric potential acting simultaneously on the electrons so released. The essence of the method of the present invention is the direction of a flash of light upon a light sensitive element capable of emitting electrons at any desired point in the wave form of the periodic pulse to be measured while at the same time applying to the light sensitive element a potential having the same value as the potential of the periodic pulse at the point in its wave form at which the light flash occurs. The method includes successively changing the point in the wave form at which the light flash occurs followed by measurements of current or potential after each adjustment until the whole wave form is reproduced. It also includes as an optional feature the measurement of the numerical value of the current or potential of the periodic pulse being examined at the various points in its wave form at which the light flashes occur.

The method of the present invention is capable of being carried out with diverse forms of apparatus. A few of the preferred forms of apparatus are illustrated in the accompanying drawings in which—

Figure 1 is a diagrammatic representation of a circuit suitable for carrying out the method of the present invention in which means are provided for creating periodic flashes of light at selected intervals;

Figure 2 is a diagrammatic representation of a modified form of the circuit shown in Figure 1 in which means are provided to supply greater flexibility and more information;

Figure 3:
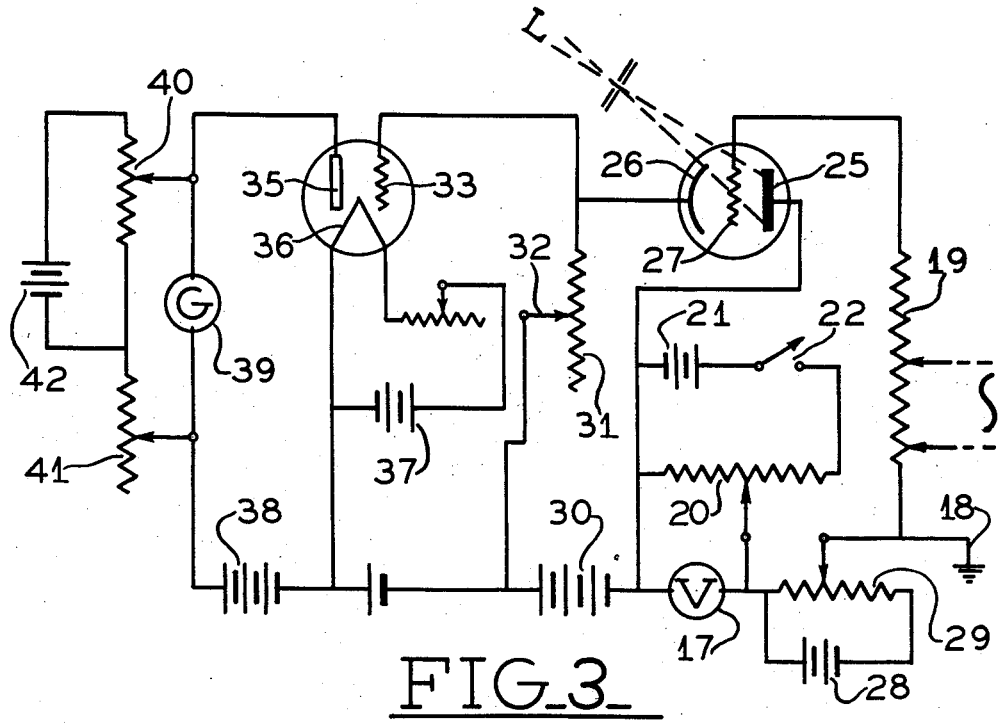
Figure 3 is a diagrammatic illustration of still another form of circuit which embodies an electrometer tube detector.

Referring to Figure 1 in detail, numeral 1 designates a motor frame carrying a motor to the shaft of which is keyed a thin disc 2 of light metal such as aluminum or a similar metal having a slit 3 adjacent its periphery. Rigidly fixed to the housing of the motor, in which the motor is journaled and which is rotatable in the frame 1, is a gear 4. Mounted in brackets 5 in such a manner as to mesh with gear 4 is a worm gear 6 operated by knurled wheel 7 which carries a pointer 8 which moves over a scale 9 in the form of a circular disc graduated in degrees.

Mounted in a position to be focused on a slit 3 is a light source 10, which may be a movie "sound track" lamp with a linear filament about 1 cm. long, the light from which passes through a condensing lens 11 and through the slit 3, when the latter is in position, to the light sensitive plate or cathode 12 of a photo electric cell 13. The anode 14 of the cell 13 is connected to a galvanometer 15 and to a battery 16, which is of sufficient magnitude to maintain the operation of the tube in the linear part of its cathode potential-anode current characteristic. The anode is also connected through voltmeter 17 to ground wire 18 to which the cathode is also connected through resistance 19 across which the periodic impulse of electrical potential or current is applied. The resistance 19 is variable so that any desired part, or none of it, can be included in the circuit depending upon the magnitude of the potential or current which is to be investigated. Connected in series with voltmeter 17 is an adjustable resistance 20 across which is connected a battery 21. The circuit including the voltmeter, the resistance 20 and battery 21, is controlled by switch 22.

The motor is of the synchronous type and is operated by the periodic pulse of electrical energy which is to be investigated. That is to say, the motor is so selected that the frequency of the periodic electrical impulse will always be at least equal numerically to the revolutions per second of the motor, and will usually be a multiple thereof. In other words, the time required for one revolution of the motor will be at least equal to the duration of one cycle of the periodic impulse to be measured and will, preferably, be equal to the duration of several whole cycles of said periodic impulse. When the former is the case, one slit will be employed in disc 2. When the latter is the case, the number of slits employed in disc 2 will be the same as the multiple relation between the frequency of the periodic pulse and the revolutions per second of the motor. Thus, for a sixty cycle pulse and a motor making thirty revolutions per second, two slits will be employed.

With switch 22 open, the periodic impulse to be examined is applied simultaneously to the motor and to the photo cell circuit as indicated above. Since the frequency of this impulse is equal to, or is a multiple of, the speed of the motor in revolutions per second, the light flash from source 10 will pass through the slit 3 at all times at the same point on the wave of the periodic impulse. This flash will strike the light sensitive cathode 12 setting up a flow of electrons. Simultaneously, a voltage of a magnitude corresponding to that point on the wave form at which the light is flashed is impressed across the photo electric cell and sets up an anode current which will be proportional to it. This current is recorded on the galvanometer which may be read.

In order to measure the actual value of the voltage or the current at the point in its wave form at which the flash occurs, the switch 22 is closed, the electrical impulse is withdrawn from resistance 19 and the reading of voltmeter 17 is reduced to zero by adjusting resistance 20. The galvanometer 15 is then read. The electrical impulse is then applied to resistance 19 and resistance 20 is adjusted until the galvanometer 15 gives the same reading as it gave with a zero reading of voltmeter 17. When this adjustment is made the reading on voltmeter 16 is the value of the voltage of the electrical impulse at the point when the flash occurs, when the impulse is a potential impulse. When the impulse is a current impulse, the reading of voltmeter 17 divided by the value of resistance of the circuit gives the value of the current impulse at the point at which the flash occurs. Alternatively, the galvanometer and voltmeter can be read with the electrical impulse not applied and with switch 22 closed, the impulse is applied, resistance 20 is adjusted until the galvanometer reads the same as it did without the impulse and the initial reading of the voltmeter is substracted from the reading obtained by said adjustment of resistance 20 after the application of the impulse to give the numerical value of the impulse potential.

As previously stated, when the necessary readings have been made with one setting of the pointer 8 on scale 9, the pointer is moved one or more degrees thereby rotating the motor casing about its axis and shifting the point on the wave form of the applied impulse at which the flash occurs a corresponding amount. Readings are again taken at this setting and the operation is repeated until enough points on the wave form are obtained to identify its shape.

In Figure 2 parts which are the same as those shown in Figure 1 bear the same numerals. The difference between the two arrangements is that in Figure 2 a three element photo tube is employed. This tube has a casing 23 which is grounded at 24. This tube contains a cathode 25 upon which the light flash falls, an anode 26 and an intervening grid 27. The periodic impulse to be investigated is impressed upon the grid instead of upon the cathode as in the arrangement shown in Figure 1. Also impressed upon the grid is a biasing voltage supplied by battery 28 which is maintained by resistance 29 at such a value as to keep the operation of the tube within the linear portion of its grid potential-anode current characteristic. The galvanometer 15, which may be replaced by a tube amplifier, is placed across the cathode and anode which are supplied by battery 30.

In this case, as before, when it is desired only to identify the wave form of the electrical impulse, the switch 22 is held in open position. When it is desired to measure the actual value of the voltage or current at the various points along the wave form of the electrical impulse, the procedure outlined above with respect to Figure 1 is followed.

The arrangement shown in Figure 3 is much the same as that shown in Figure 2 with the exception that the output of the photo sensitive tube is impressed across a resistance 31 which is between the anode and cathode in the same way that the galvanometer 15 was arranged in Figure 2. The voltage drop set up in resistance 31, which may be adjusted by regulation of pointer 32, is impressed upon the grid 33 of a vacuum tube 34 having a plate 35 and a filament 36 which latter is supplied by battery 37. The plate is supplied by battery 38 and its output is impressed across the galvanometer 39.

Also impressed across the galvanometer 39 is a balancing circuit composed of resistances 40 and 41 connected in series with the galvanometer and a battery 42 connected across the resistance 40. This circuit can be used to check the galvanometer readings to ascertain if drift occurs, but is mainly used to balance out the current which is normally flowing through the galvanometer from battery 38. This balancing is done by removing the voltage from resistance 19 and adjusting resistance 40 or 41 until the galvanometer reads zero. In this way, the galvanometer is made to indicate accurately the current or voltage resulting from the potential impressed across resistance 19 at the time a flash of light strikes the light sensitive element.

The operation of this arrangement is the same as that shown in Figure 2. For the sake of convenience the mechanism for creating the light flashes is omitted and the light source is designated as "L." For identification of the wave form the switch 22 is held in open position as previously described and successive readings are taken with different settings of the portion of the wave form at which the light flashes occur.

Figure 4:
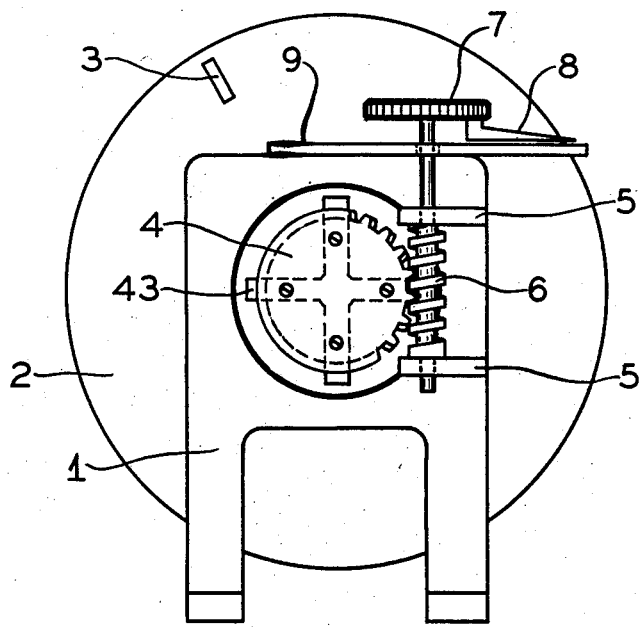
Figure 4 is a side elevation, with certain parts shown in dotted lines, of the motor showing the mechanism for controlling the point on the wave form undergoing investigation at which the light flash shall occur.

From Figure 4 it can be seen that the casing of the motor is rotatably mounted in the framework 1. The rotor of the motor is journaled at the intersection of cross arms 43 arranged across the ends of the casing. The gear 4 is bolted to these cross arms at one end of the casing. The brackets 5 are secured to the framework 1 and carry the worm gear 6 which is controlled by the hand wheel 7.

The above described method is applicable to the detection and measurement of periodic electrical disturbances of any magnitude due to any cause whatsoever, in commercial alternating current circuits, in determination of the output of alternating current and sound wave amplifiers, in radio circuits, in loud speaker systems, in microphone detecting devices, in electrical geophysical methods in which the effect of substrata on the wave form of periodic impulses is observed, and in other devices and procedures of like nature. More particularly it is applicable to the measurement of the wave form of any periodic current or potential whose period is large compared to the duration of the light flash and with which the motor or other mechanism which creates the light flashes may be brought into synchronization. The method can be adapted to the measurement of input potentials as low as .001 volt, when the electrometer tube is employed as well as to the measurement of the wave forms of high currents and potentials in which case the bulk of the current and potential may be shunted in order to give convenient inputs of a few volts to the measuring circuit.

Changes in the arrangement of parts and in the types of individual elements employed may occur to those skilled in the art. Such changes, so long as they do not depart from the fundamental principles involved in the present invention, are contemplated within the scope of the appended claims in which it is intended to claim this invention as broadly as the prior art permits.

I claim:

1. A method for determining the wave form of a periodic electrical impulse which comprises exposing an element capable of emitting electrons under the influence of light to a flash of light at a selected point on the wave of the impulse, simultaneously impressing on the light sensitive element a potential corresponding to that of the impulse at the point on its wave at which the light flash occurs, exhibiting the current resulting from the impression of said potential on said light sensitive element, and repeating the aforesaid series of steps, while selecting a different point on the wave of the impulse for the light flash each time, until enough points have been determined to identify the wave form.

2. A method for determining the magnitude of a periodic electrical impulse at any desired point in its cycle which comprises subjecting an element capable of emitting electrons under the action of light to a flash of light at the selected point on the cycle of the impulse, simultaneously impressing upon the light sensitive element the potential of the impulse at the selected point in its cycle and measuring the current resulting from the impression of said potential on the light sensitive element.

3. An apparatus for examining the wave form of a periodic electrical impulse comprising an element adapted to emit electrons under the influence of light in an amount corresponding to the potential applied to it, means for directing a flash of light on said element on a given point on the wave form to be examined, means for simultaneously applying to said element a potential corresponding to that of the impulse at the point on its wave at which the light flash occurs, whereby a current is caused to flow, and means for exhibiting the value of said current.

4. An apparatus for examining the wave form of a periodic electrical impulse comprising a motor adapted to be driven in synchronism with the impulse to be examined, a disk driven by said motor, a radial slit in said disk, a light source on one side of said disk in line with said slit, an element adapted to emit electrons under the influence of light in an amount corresponding to the potential applied to it arranged on the other side of the disk in line with said slit and light source, means for applying the electrical impulse to be examined to said light sensitive element whereby a current is caused to flow when said element is subjected to light, and means for observing the value of said current.

5. An apparatus for examining the wave form of a periodic electrical impulse comprising a motor adapted to be driven in synchronism with the impulse to be examined, a disk driven by said motor, a radial slit in said disk, a light source on one side of said disk in line with said slit, an element adapted to emit electrons under the influence of light in an amount proportional to the intensity of said light arranged on the other side of the disk in line with said slit and light source, said element being arranged in an electrical circuit, and means in said electrical circuit for observing the value of the current therein.

6. An apparatus for examining the wave form of a periodic electrical impulse comprising a motor adapted to be driven in synchronism with the impulse to be examined, said motor including a stator and a rotor, a disk carried by said rotor, a radial slit in said disk, a light source on one side of said disk in line with said slit, an element adapted to emit electrons under the influence of light arranged on the other side of the disk in line with said slit and light source, and means for rotating the stator of said motor by measured amounts.

WALTER S. HUXFORD.